United States Patent
Lutz et al.

(10) Patent No.: US 6,520,020 B1
(45) Date of Patent: Feb. 18, 2003

(54) METHOD AND APPARATUS FOR A DIRECT BONDED ISOLATED PRESSURE SENSOR

(75) Inventors: Mark A. Lutz, Minneapolis, MN (US); Roger Frick, Hackensack, MN (US); Fred C. Sittler, Excelsior, MN (US); Adrian C. Toy, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 09/478,383

(22) Filed: Jan. 6, 2000

(51) Int. Cl.$^7$ .................................................. G01L 7/00
(52) U.S. Cl. ....................................................... 73/706
(58) Field of Search ...................... 73/706, 724, 718, 73/717, 147, 705, 700, 180, 116, 115, 720; 361/283.4, 283.1, 283; 374/143; 324/661, 688

(56) References Cited

U.S. PATENT DOCUMENTS

| | | |
|---|---|---|
| 3,079,576 A | 2/1963 | Kooiman .......................... 338/4 |
| 3,147,085 A | 9/1964 | Gatti ............................ 23/284 |
| 3,239,827 A | 3/1966 | Werner et al. ............... 340/236 |
| 3,356,963 A | 12/1967 | Buck ............................ 331/65 |
| 3,387,226 A | 6/1968 | Haisma et al. ............. 331/94.5 |
| 3,405,559 A | 10/1968 | Moffatt ......................... 73/398 |
| 3,477,036 A | 11/1969 | Haisma ..................... 331/94.5 |
| 3,589,965 A | 6/1971 | Wallis et al. ............... 156/272 |
| 3,645,137 A | 2/1972 | Hazen .......................... 73/398 |
| 3,696,985 A | 10/1972 | Herring et al. ............. 228/4.29 |
| 3,743,552 A | 7/1973 | Fa ............................. 148/175 |
| 3,744,120 A | 7/1973 | Burgess et al. ............... 29/494 |
| 3,750,476 A | 8/1973 | Brown ......................... 73/398 |
| 3,766,634 A | 10/1973 | Babcock et al. ........... 29/471.9 |
| 3,834,604 A | 9/1974 | Fendley et al. ................ 228/5 |
| 3,854,892 A | 12/1974 | Burgess et al. ............ 29/196.1 |
| 3,858,097 A | 12/1974 | Polye ......................... 317/248 |
| 3,899,878 A | * 8/1975 | Compton et al. ........ 60/39.28 T |
| 3,939,559 A | 2/1976 | Fendley et al. ............... 29/628 |
| RE28,798 E | 5/1976 | Herring et al. ............... 228/5.5 |
| 3,962,921 A | 6/1976 | Lips ............................ 73/398 |
| 3,994,430 A | 11/1976 | Cusano et al. .............. 228/122 |
| 4,018,374 A | 4/1977 | Lee et al. .................... 228/121 |
| 4,064,549 A | 12/1977 | Cretzler ...................... 361/283 |
| 4,078,711 A | 3/1978 | Bell et al. .................... 228/123 |
| 4,084,438 A | 4/1978 | Lee et al. ...................... 73/706 |
| 4,088,799 A | 5/1978 | Kurtin .......................... 427/38 |
| 4,127,840 A | 11/1978 | House ........................... 338/4 |
| 4,128,006 A | 12/1978 | Grabow ........................ 73/724 |
| 4,158,217 A | 6/1979 | Bell ............................ 361/283 |

(List continued on next page.)

FOREIGN PATENT DOCUMENTS

CH 632891 A3 11/1982

(List continued on next page.)

OTHER PUBLICATIONS

"Why Nanoparticles are so Big", *Chemical Engineering*, by Charlene Crabb et al., pp. 37–41, Apr. 1999.

(List continued on next page.)

*Primary Examiner*—William Oen
(74) *Attorney, Agent, or Firm*—Westman, Champlin & Kelly, P.A.

(57) ABSTRACT

A pressure sensor integrally formed in the shape of a beam around a central channel. The beam has an integral blind end that is pressurized by the fluid. The beam has an opposite end that is shaped to provide a stepped corner with a gap opening at the base of the stepped corner, where the gap and isolated from the fluid. A sensing film in the channel adjacent the blind end has an electrical parameter that varies with pressure and electrical leads that extend from the channel and out the gap. A seal fills the gap around the leads and the seal fills a portion of the stepped corner. The sensor is preferably formed by direct bonding of single crystal alumina layers. Applications include industrial pressure transmitters, aerospace and turbine engine pressure sensing.

16 Claims, 9 Drawing Sheets

U.S. PATENT DOCUMENTS

| | | | |
|---|---|---|---|
| 4,177,496 A | 12/1979 | Bell et al. ................... | 361/283 |
| 4,196,632 A | 4/1980 | Sikorra ........................ | 73/718 |
| 4,202,217 A | 5/1980 | Kurtz et al. .................. | 73/727 |
| 4,208,782 A | 6/1980 | Kurtz et al. .................. | 29/580 |
| 4,216,404 A | 8/1980 | Kurtz et al. ................ | 310/338 |
| 4,222,277 A | 9/1980 | Kurtz et al. ................ | 310/338 |
| 4,236,137 A | 11/1980 | Kurtz et al. ................... | 338/4 |
| 4,257,274 A | 3/1981 | Shimada et al. .............. | 73/718 |
| 4,274,125 A | 6/1981 | Vogel ......................... | 361/283 |
| 4,276,533 A | 6/1981 | Tominaga et al. ............. | 338/4 |
| 4,278,195 A | 7/1981 | Singh ........................ | 228/123 |
| 4,287,501 A | 9/1981 | Tominaga et al. ............ | 338/42 |
| 4,301,492 A | 11/1981 | Paquin et al. .............. | 361/283 |
| 4,359,498 A | 11/1982 | Mallon et al. .............. | 428/156 |
| 4,366,716 A | 1/1983 | Yoshida ....................... | 73/718 |
| 4,389,895 A | 6/1983 | Rud, Jr. ....................... | 73/724 |
| 4,410,872 A | 10/1983 | Stecher et al. ............. | 338/114 |
| 4,412,203 A | 10/1983 | Kurtz et al. ................... | 338/4 |
| 4,416,156 A | 11/1983 | Demark et al. .............. | 73/727 |
| 4,419,142 A | 12/1983 | Matsukawa ................ | 148/1.5 |
| 4,422,125 A | 12/1983 | Antonazzi et al. .......... | 361/283 |
| 4,422,335 A | 12/1983 | Ohnesorge et al. .......... | 73/724 |
| 4,424,713 A | 1/1984 | Kroninger, Jr. et al. ....... | 73/718 |
| 4,426,673 A | 1/1984 | Bell et al. .................. | 361/283 |
| 4,434,665 A | 3/1984 | Adolfsson et al. ........... | 73/724 |
| 4,443,293 A | 4/1984 | Mallon et al. .............. | 156/647 |
| 4,454,765 A | 6/1984 | Lodge ......................... | 73/724 |
| 4,456,901 A | 6/1984 | Kurtz et al. ................... | 338/4 |
| 4,479,070 A | 10/1984 | Frische et al. .............. | 310/338 |
| 4,495,820 A | 1/1985 | Shimada et al. .............. | 73/724 |
| 4,497,473 A | 2/1985 | Robyn et al. ................. | 266/44 |
| 4,507,973 A | 4/1985 | Barr et al. .................... | 73/724 |
| 4,517,622 A | 5/1985 | Male ......................... | 361/283 |
| 4,525,766 A | 6/1985 | Petersen ..................... | 361/283 |
| 4,535,219 A | 8/1985 | Sliwa, Jr. ..................... | 219/121 |
| 4,539,061 A | 9/1985 | Sagiv ........................ | 156/278 |
| 4,542,436 A | 9/1985 | Carusillo ..................... | 361/283 |
| 4,547,801 A | 10/1985 | Haisma et al. .............. | 358/111 |
| 4,558,817 A | 12/1985 | Kiendl ..................... | 236/12.12 |
| 4,572,000 A | 2/1986 | Kooiman ..................... | 73/718 |
| 4,586,109 A | 4/1986 | Peters et al. ................. | 261/283 |
| 4,591,401 A | 5/1986 | Neidig et al. ................. | 156/89 |
| 4,598,996 A | 7/1986 | Taniuchi ....................... | 356/43 |
| 4,609,966 A | 9/1986 | Kuisma ...................... | 361/283 |
| 4,625,559 A | 12/1986 | Carter et al. ................. | 73/706 |
| 4,628,403 A | 12/1986 | Kuisma ...................... | 361/283 |
| 4,649,070 A | 3/1987 | Kondo et al. ............... | 428/209 |
| 4,689,999 A | 9/1987 | Shkedi ........................ | 73/708 |
| 4,703,658 A | 11/1987 | Mrozack, Jr. et al. ......... | 73/724 |
| 4,716,492 A | 12/1987 | Charboneau et al. ........ | 361/283 |
| 4,752,109 A | 6/1988 | Zabler ........................ | 73/115 |
| 4,754,365 A | 6/1988 | Kazahaya ................... | 361/283 |
| 4,764,747 A | 8/1988 | Kurtz et al. ................... | 338/2 |
| 4,769,882 A | 9/1988 | Rosen et al. ............... | 29/25.35 |
| 4,773,972 A | 9/1988 | Mikkor ....................... | 204/16 |
| 4,774,196 A | 9/1988 | Blanchard ................... | 437/24 |
| 4,780,572 A | 10/1988 | Kondo et al. ............... | 174/52 |
| 4,800,758 A | 1/1989 | Knecht et al. ............... | 73/727 |
| 4,806,783 A | 2/1989 | Anderson ................... | 307/118 |
| 4,810,318 A | 3/1989 | Haisma et al. .............. | 156/153 |
| 4,849,374 A | 7/1989 | Chen et al. .................. | 437/209 |
| 4,852,408 A | 8/1989 | Sanders ....................... | 73/718 |
| 4,857,130 A | 8/1989 | Curtis ....................... | 156/292 |
| 4,875,368 A | 10/1989 | Delatorre .................... | 73/151 |
| 4,879,903 A | 11/1989 | Ramsey et al. .............. | 73/431 |
| 4,883,215 A | 11/1989 | Goesele et al. ............. | 228/116 |
| 4,901,197 A | 2/1990 | Albarda et al. ............. | 361/283 |
| 4,908,921 A | 3/1990 | Chen et al. ................ | 29/25.41 |
| 4,929,893 A | 5/1990 | Sato et al. .................. | 324/158 |
| 4,954,925 A | 9/1990 | Bullis et al. ................ | 361/283 |
| 4,971,925 A | 11/1990 | Alexander et al. ............ | 437/62 |
| 4,972,717 A | 11/1990 | Southworth et al. .......... | 73/724 |
| 4,980,243 A | 12/1990 | Malikowski et al. ........ | 428/621 |
| 4,983,251 A | 1/1991 | Haisma et al. .............. | 156/630 |
| 4,994,781 A | 2/1991 | Sahagen ....................... | 338/47 |
| 5,001,934 A | 3/1991 | Tuckey ........................ | 73/721 |
| 5,005,421 A | 4/1991 | Hegner et al. ................. | 73/72 |
| 5,009,689 A | 4/1991 | Haisma et al. ................ | 65/33 |
| 5,013,380 A | 5/1991 | Aoshima .................... | 156/250 |
| 5,024,098 A | 6/1991 | Petitjean et al. .............. | 73/729 |
| 5,028,558 A | 7/1991 | Haisma et al. ................ | 437/62 |
| 5,044,202 A | 9/1991 | Southworth et al. .......... | 73/724 |
| 5,050,034 A | 9/1991 | Hegner et al. .............. | 361/283 |
| 5,050,035 A | 9/1991 | Hegner et al. .............. | 361/283 |
| 5,068,712 A | 11/1991 | Murakami et al. ............ | 357/72 |
| 5,084,123 A | 1/1992 | Curtis ....................... | 156/292 |
| 5,087,124 A | 2/1992 | Smith et al. ................ | 356/358 |
| 5,088,329 A | 2/1992 | Sahagen ....................... | 73/727 |
| 5,094,109 A | 3/1992 | Dean et al. ................... | 73/718 |
| 5,095,741 A | 3/1992 | Bartig et al. .................. | 73/115 |
| 5,113,868 A | 5/1992 | Wise et al. .................. | 128/675 |
| 5,123,849 A | 6/1992 | Deak et al. ................... | 439/66 |
| 5,133,215 A | 7/1992 | Lane, III et al. .............. | 73/756 |
| 5,155,061 A | 10/1992 | O'Connor et al. ............. | 437/86 |
| 5,157,972 A | 10/1992 | Broden et al. ................ | 73/718 |
| 5,174,926 A | 12/1992 | Sahagen ..................... | 252/521 |
| 5,178,015 A | 1/1993 | Loeppert et al. .............. | 73/718 |
| 5,189,591 A | 2/1993 | Bernot ....................... | 361/283 |
| 5,189,916 A | 3/1993 | Mizumoto et al. ............ | 73/724 |
| 5,197,892 A | 3/1993 | Yoshizawa et al. ........... | 439/91 |
| 5,201,228 A * | 4/1993 | Kojima et al. ................ | 73/724 |
| 5,201,977 A | 4/1993 | Aoshima .................... | 156/153 |
| 5,214,563 A | 5/1993 | Estes ......................... | 361/386 |
| 5,214,961 A | 6/1993 | Kojima et al. ................ | 73/715 |
| 5,227,068 A | 7/1993 | Runyon ...................... | 210/610 |
| 5,228,862 A | 7/1993 | Baumberger et al. ......... | 439/66 |
| 5,231,301 A | 7/1993 | Peterson et al. .............. | 257/419 |
| 5,236,118 A | 8/1993 | Bower et al. ............... | 228/193 |
| 5,242,863 A | 9/1993 | Xiang-Zheng et al. ...... | 437/228 |
| 5,242,864 A | 9/1993 | Fassberg et al. ............. | 437/228 |
| 5,257,542 A | 11/1993 | Voss ........................... | 73/724 |
| 5,261,999 A | 11/1993 | Pinker et al. ................ | 156/630 |
| 5,271,277 A | 12/1993 | Pandorf ....................... | 73/724 |
| 5,287,746 A | 2/1994 | Broden ....................... | 73/706 |
| 5,294,760 A | 3/1994 | Bower et al. ................ | 200/83 |
| 5,314,107 A | 5/1994 | d'Aragona et al. ......... | 228/116 |
| 5,315,481 A | 5/1994 | Smolley ..................... | 361/707 |
| 5,319,324 A | 6/1994 | Satoh et al. ................. | 331/158 |
| 5,326,726 A | 7/1994 | Tsang et al. ................. | 437/228 |
| 5,332,469 A | 7/1994 | Mastrangelo ............... | 156/643 |
| 5,349,492 A | 9/1994 | Kimura et al. ........... | 361/283.4 |
| 5,381,300 A | 1/1995 | Thomas et al. .............. | 361/280 |
| 5,424,650 A | 6/1995 | Frick .......................... | 324/688 |
| 5,437,189 A | 8/1995 | Brown et al. ................. | 73/721 |
| 5,440,075 A | 8/1995 | Kawakita et al. ............ | 174/265 |
| 5,466,630 A | 11/1995 | Lur ............................. | 437/62 |
| 5,470,797 A | 11/1995 | Mastrangelo ............... | 437/225 |
| 5,471,884 A | 12/1995 | Czarnocki et al. ............ | 73/720 |
| 5,478,972 A | 12/1995 | Mizutani et al. ............ | 174/250 |
| 5,479,827 A | 1/1996 | Kimura et al. ................ | 73/718 |
| 5,481,795 A | 1/1996 | Hatakeyama et al. ......... | 29/852 |
| 5,483,834 A | 1/1996 | Frick .......................... | 73/724 |
| 5,528,452 A | 6/1996 | Ko .......................... | 361/283.4 |
| 5,532,187 A * | 7/1996 | Schreiber-Prillwitz et al. .......................... | 437/182 |
| 5,554,809 A | 9/1996 | Tobita et al. ................. | 73/700 |
| 5,612,497 A | 3/1997 | Walter et al. ................. | 73/756 |
| 5,637,802 A | 6/1997 | Frick et al. .................. | 73/724 |
| 5,731,522 A | 3/1998 | Sittler ........................ | 73/708 |
| 6,106,476 A | 8/2000 | Corl et al. ................... | 600/486 |
| 6,126,889 A | 10/2000 | Scott et al. ................. | 264/632 |

| | | | | | | |
|---|---|---|---|---|---|---|
| | 6,131,462 A | 10/2000 | EerNisse et al. ............... 73/702 | SU | 736216 | 5/1980 |
| | 6,311,563 B1 | 11/2001 | Ishikura ........................ 73/724 | SU | 1398825 A1 | 5/1988 |
| | | | | SU | 1597627 A1 | 10/1990 |
| | FOREIGN PATENT DOCUMENTS | | | SU | 1629763 A1 | 2/1991 |
| | | | | WO | WO 83/00385 | 2/1983 |
| CZ | | 153132 | 5/1974 | WO | WO 85/02677 | 6/1985 |
| DE | | 1 648 764 | 6/1971 | WO | WO 87/07947 | 12/1987 |
| DE | | 2 021 479 | 11/1971 | WO | WO 87/07948 | 12/1987 |
| DE | | 2 221 062 | 11/1972 | WO | WO 93/22644 | 11/1993 |
| DE | | 24 59 612 | 7/1975 | WO | WO 96/16418 | 5/1996 |
| DE | | 42 44 450 A1 | 7/1983 | | | |
| DE | | 34 04 262 A1 | 9/1984 | | | |
| DE | | 40 11 901 A1 | 10/1991 | | | |
| EP | | 0 024 945 A2 | 9/1980 | | | |
| EP | | 0 136 050 A1 | 8/1984 | | | |
| EP | | 0 161 740 A2 | 2/1985 | | | |
| EP | | 0 166 218 A2 | 5/1985 | | | |
| EP | | 0 182 032 A2 | 9/1985 | | | |
| EP | | 0 190 508 A2 | 12/1985 | | | |
| EP | | 0 207 272 A2 | 5/1986 | | | |
| EP | | 0 213 299 A2 | 6/1986 | | | |
| EP | | 0 210 843 A2 | 7/1986 | | | |
| EP | | 0 256 150 A1 | 8/1986 | | | |
| EP | | 0 351 701 B1 | 7/1989 | | | |
| EP | | 0 355 340 A1 | 2/1990 | | | |
| EP | | 0 383 391 A1 | 8/1990 | | | |
| EP | | 0 430 676 A2 | 11/1990 | | | |
| EP | | 0 410 679 A1 | 1/1991 | | | |
| EP | | 0 413 547 A2 | 2/1991 | | | |
| EP | | 0 444 942 A1 | 9/1991 | | | |
| EP | | 0 444 943 A | 9/1991 | | | |
| EP | | 0 451 993 A2 | 10/1991 | | | |
| EP | | 0 456 060 A1 | 11/1991 | | | |
| EP | | 0 460 763 A2 | 11/1991 | | | |
| EP | | 0 473 109 | 3/1992 | | | |
| EP | | 0 476 897 A2 | 3/1992 | | | |
| EP | | 0 526 290 A1 | 2/1993 | | | |
| EP | | 0 547 684 A2 | 6/1993 | | | |
| EP | | 0 556 009 A2 | 8/1993 | | | |
| EP | | 0 579 298 A1 | 1/1994 | | | |
| EP | | 0 928 959 A2 | 7/1999 | | | |
| FR | | 1 568 487 | 5/1969 | | | |
| FR | | 2 246 506 | 5/1975 | | | |
| FR | | 2 455 733 | 11/1980 | | | |
| GB | | 1 069 435 | 11/1963 | | | |
| GB | | 1 305 885 | 4/1971 | | | |
| GB | | 2034478 | 6/1980 | | | |
| GB | | 2 071 853 A | 3/1981 | | | |
| GB | | 2 168 160 A | 11/1985 | | | |
| JP | | 49-38911 | 4/1974 | | | |
| JP | | 60-97676 | 5/1985 | | | |
| JP | | 62-70271 | 3/1987 | | | |
| JP | | 60-195546 | 7/1987 | | | |
| JP | | 62-167426 | 7/1987 | | | |
| JP | Sho 62[1987]-10 | | 7/1987 | | | |
| JP | | 62-259475 | 11/1987 | | | |
| JP | | 63-292032 | 11/1988 | | | |
| JP | Sho 63[1988]-285 | | 11/1988 | | | |
| JP | | 91-311556 | 4/1990 | | | |
| JP | | 2-148768 | 6/1990 | | | |
| JP | | 2-249936 | 10/1990 | | | |
| JP | | 3-239940 | 10/1991 | | | |
| JP | | 2852593 | 3/1993 | | | |
| JP | | 5-107254 | 4/1993 | | | |
| JP | | 6-300650 | 4/1993 | | | |
| JP | | 5-231975 | 9/1993 | | | |
| JP | | 6-21741 | 1/1994 | | | |
| JP | | 6-265428 | 9/1994 | | | |
| JP | | 2852593 | 9/1997 | | | |
| JP | | 2000111434 | 10/1998 | | | |
| JP | | 11006780 | 12/1999 | | | |
| SU | | 463643 | 10/1975 | | | |

OTHER PUBLICATIONS

U.S. patent application Ser. No. 09/477,689, Sittler, filed Jan. 06, 2000.
U.S. patent application Ser. No. 09/478,434, Frick et al., filed Jan. 06, 2000.
U.S. patent application Ser. No. 09/603,640, Sittler et al., filed Jun. 26, 2000.
U.S. patent application Ser. No. 09/755,346, Romo et al., filed Jan. 05, 2001.
"Silicon–on–Sapphire Pressure Sensor", by C. Qinggui et al., *Transducers*, (1987), 4 pgs.
"Spectroscopic Study of the Surfaces of Glass Joined by Optical Contact", by V.M. Zolotarev et al., *Sov. J. Opt. Technol.*, (Jun. 1977), pp. 379–380.
"Effect of Scale and Time Factors on the Mechanical Strength of an Optical Contact", by S.S. Kachkin et al., *Sov. J. Opt. Technol.*, vol. 56, No. 2, (Feb. 1989), pp. 110–112.
"High Pressure Sensors", *Instrument Engineers Handbook vol. 1, Process Measurement*, B. Liptak, Editor, pp. 244–245.
"Silicon on Sapphire: The Key Technology for High–Temperature Piezoresistive Pressure Transducers", by H.W. Keller et al., *Transducers*, (1987), 4 pgs.
"Optical–Contact Bonding Strength of Glass Components", by S.S. Kachkin et al., *Sov. J. Opt. Technol.*, vol. 47, No. 3, (Mar. 1980), pp. 159–161.
"A Cold High–Vacuum Seal Without Gaskets", by L. Macebo, *University of California Lawrence Radiation Laboratory*, (Sep. 1, 1962), pp. 1–11.
"Diffusionsschweissen Optischer Bauelemente Aus Quarzglas", by K. Veb et al., Schweisstechnik, Berlin, (1983), pp. 262–264.
"Pressure and Temperature Measurements with Saw Sensors", by D. Hauden et al., *36th Annual Frequency Control Symposium*, (1982), pp. 284–289.
"Transient Response of Capacitive Pressure Sensors", by P. Pons et al., *Sensors and Actuators*, (1992) pp. 616–621.
"Analysis and Design of a Four–Terminal Silicon Pressure Sensor at the Centre of a Diaphragm", by M. Bao et al, *Sensors and Actuators*, (1987), pp. 49–56.
"A Stress and Temperature Compensated Orientation and Propagation Direction for Surface Acoustic Wave Devices", by B. Sinha, *IEEE Transactions on Ultrasonics, Ferroelectrics, and Frequency Control*, vol. UFFC–34, No. 1, (Jan. 1987), pp. 64–74.
"Nonlinear Analyses on CMOS Integrated Silicon Pressure Sensors", by K. Suzuki et al., *IEEE*, (1985), pp. 137–140.
"New Techniques for Fusion Bonding and Replication for Large Glass Reflectors", by J.R. Angel, Steward Observatory , University of Arizona, pp. 52–56.
"Pressure Sensitivity in Anisotropically Etched Thin–Diaphragm Pressure Sensors", by S. Clark et al, *IEEE Transactions on Electron Devices*, vol. Ed–26, No. 12, (Dec. 1979), pp. 1887–1896.
"A Model for the Silicon Wafer Bonding Process", by R. Stengl et al., *Japanese Journal on Applied Physics*, (Oct. 1989), pp. 1735–1741.

"Study of the Stressed State of a Sintered Quartz Monoblock", by Y. Lisitsyn et al., Plenum Publishing Corporation, (1986), pp. 643–645.

"Direct Bonding in Patent Literature", by J. Haisma, *Philips J. Res.*, (1995), pp. 165–170.

"Special Issue on Direct Bonding", by J. Haisma et al., *Philips Journal of Research*, vol. 49, No. 1/2, (1995), pp. 1–182.

"Diversity and Feasibility of Direct Bonding: A Survey of a Dedicated Optical Technology", by J. Haisma et al., *Applied Optics*, vol. 33, No. 7, (Mar. 1994), pp. 1154–1169.

"Structure and Morphology of the Reaction Fronts During the Formation of $MgAl_2O_4$ Thin Films by Solid State Reaction Between R–cut Sapphire Substrates and MgO Films", by D. Hesse et al., *Interface Science*, (1994) pp. 221–237.

"Development of a High Temperature Capacitive Pressure Transducer", by R.L. Egger, *NASA CR–135282* (Oct. 1977)., pp. 1–114.

"High Temperature Pressure Transducer", *Techlink Industry*, Techlink No. 2359, (1978), 2 pgs.

"Quartz Capsule Pressure Transducer for the Automotive Industry", by D.Y. Lee et al., *SAE Technical Paper Series Society of Automotive Engineers, Inc.*, (Feb. 1981), 6 pgs.

"Low–Cost High–Sensitivity Integrated Pressure and Temperature Sensor", by P. Pons et al., *Sensors and Actuators*, (1994), pp. 398–401.

"A New Type of High Performance Device for VLSI Digital System", by X. Xiao–Li et al., *Solid State Devices*, (1988), pp. 579–582.

"Wafer Bonding For SOI", by W.P. Maszara et al., *Mat. Res. Soc. Symp. Proc.*. vol. 107, (1988), 2 pgs.

"Silicon Fusion Bonding For Pressure Sensors", by K. Peterson et al., *IEEE*, (1988), pp. 146–147.

"Silicon–To–Silicon Direct Bonding Method", by M. Shimbo et al., *Journal of Applied Physics*, vol. 60, No. 8, (Oct. 1986), pp. 2987–2989.

"A Model for the Silicon Wafer Bonding Process", by R. Stengl et al., *Japanese Journal of Applied Physics*, vol. 28, No. 10, (Oct. 1989), pp. 1735 & 1741.

"A Small and Stable Continuous Gas Laser", by H.G. Van Bueren et al., *Physics Letters* vol. 2, No. 7, (Nov. 1962), 2 pgs.

"Direct Bonding of Ceramics and Metals by Means of a Surface Activation Method in Ultrahigh Vacuum", by T. Suga et al., *Proceedings of the MRS International Meeting on Advanced Materials*, vol. 8, (Jun. 1988), pp. 257–263.

"Silicon–On–Insulator Wafer Bonding–Wafer Thinning Technological Evaluations", by J. Haisma et al., *Japanese Journal of Applied Physics*, vol. 28, No. 8, (Aug. 1989), 4 pgs.

"Closure and Repropogation of Healed Cracks in Silicate Glass", by T. Michalske et al., *Journal of the American Ceramic Society*, vol., 68, No. 11, (Nov. 1985), 3 pgs.

"Use of Strain Gauges with a Silicon–On–Sapphire Structure for Thermophysical Experiments", by V.F. Kukarin et al., Plenum Publishing Corporation, (1986) pp. 1085–1087.

"Metrological Characteristics for Sapfir–22D Pressure Sensors", by A.M. Evtyushenkov et al., Plenum Publishing Corporation, (1989), pp. 147–150.

"Low–Temperature Characteristics of the Transducer", *Rev. Sci. Instrum.*, vol. 56, No. 6, (Jun. 1985), pp. 1237–1238.

"The Joining of Ceramics", by A.S. Bahrani, *Int. J. for the Joining of Materials*, vol. 4, No. 1 (1992), pp. 13–19.

"Chemical Free Room Temperature Wafer to Wafer Direct Bonding", by S. Farrens et al., *J. Electrochem. Soc.*, vol. 142, No. 11, (Nov. 1985), pp. 3949–3955.

"Morphological Evolution of Pore Channels in Alumina", by J. Rodel et al., *Ceramic Transactions—Sintering of Advanced Ceramics*, vol. 7, (May 1988), pp. 243–257.

"Le Poli Optique, Element De La Construction Des Tubes A Vide(')", by P. Danzin et al., *Annales De Radioelectricite*, (Jan. 1948), pp. 281–289.

"Strength of Glass Ceramic S0115M and its Joints Based on Optical Contact", by A.I. Busel et al, Plenum Publishing Corporation, (1983), p. 378.

"Bubble–Free Silicon Wafer Bonding in a Non–Cleanroom Environment", by R. Stengl et al., *Department of Mechanical Engineering and Materials Science*, Duke University, (1988) p. L2364.

"Boundary Migration of Single Crystal in Polycrystalline Alumina", by M. Kinoshita, *Journal of the Ceramic Society of Japan*, vol. 82, No. 945, (1974), pp. 295–296.

"Diffusion Bonding of Ceramics", by C. Scott et al., *American Ceramic Society Bulletin*, (Aug. 1985) pp. 1129–1131.

"Creep of Sensor's Elastic Elements: Metals versus Non–metals", K. Bethe, D. Baumgarten and J. Frank, *NOVA SENSOR—Silicon Sensors and Microstructures*, 1990, pp. 844–849.

"High–Temperature Healing of Lithographically Introduced Cracks in Sapphire", J. Rödel and A.M. Glaeser, *J. Am. Ceram. Soc.*, vol. 73, No. 3, Mar. 1990, pp. 592–601.

"Fabrication of an Implantable Capacitive Type Pressure Sensor", S. Shoji, T. Nisase, M. Esashi and T. Matsuo, *Transducers '87*, 1987.

"Small sensitive pressure transducer for use at low temperatures", W. Griffioen and G. Frossati, *Rev. Sci. Instrum.*, vol. 56, No. 6, Jun. 1985, pp. 1236–1238.

"Interface charge control of directly bonded silicon structures", S. Bengtsson and O. Engström, *J. Appl. Phys.*, vol. 66, No. 3, Aug. 1, 1989, pp. 1231–1239.

"Wafer bonding for silicon–on–insulator technologies", J.B. Lasky, *Appl. Phys Lett.*, vol. 48, No. 1, Jan. 1, 1986, pp. 78–80.

"Production of Controlled–Morphology Pore Arrays: Implications and Opportunities", J. Rödel and A.M. Glaeser, *J. Am. Ceram. Soc.*, vol. 70, No. 8, Aug. 1987, pp. C–172—C–175.

"Low–Temperature Preparation of Silicon/Silicon Interface by the Silicon–to–Silicon Direct Bonding Method", by S. Bengtsson et al., *J. Electrochem. Soc.*, vol. 137, No. 7, (Jul. 1990), pp. 2297–2303.

"Phase Formation Study in $\alpha-Al_2O_3$ Implanted With Niobium Ions", by L. Romana, P. Thevenard, B. Canut, G. Massouras and R. Brenier, *Nuclear Instruments and Methods in Physics Research B46*, published by Elsevier Science Publishers B.V. (North–Holland), pp. 94–97 (1990).

"Surface electrical properties of Ni–implanted sapphire", by L. Shipu, F. Donghui, X. Ning, S. Zhenya and C. Xiaoming, *Processing of Advanced Materials*, published by Chapman & Hall, pp. 77–80 (1991).

"Silicon Microcavities Fabricated with a New Technique", L. Tenerz and B. Hök, *Electronics Letters*, vol. 22, No. 11, May 22, 1986, pp. 615–616.

"A Balanced Resonant Pressure Sensor", E. Stemme and G. Stemme, *Sensors and Actuators*, A21–A23, 1990, pp. 336–341.

"Silicon Sensors and Microstructure", J. Brysek, K. Petersen, J. Mallon, Jr., L. Christel, F. Pourahmadi, *NOVA SENSOR*, Jun. 1990, pp. 5.4–5.8, 8.21–8.23, 9.9–9.10, 9.13–9.15.

\* cited by examiner

METHOD AND APPARATUS FOR A DIRECT BONDED ISOLATED PRESSURE SENSOR

CROSS REFERENCE TO CO-PENDING APPLICATIONS

This application is related to co-pending application Ser. No. 09/477,689 filed Jan. 6, 2000 entitled PRESSURE SENSOR CAPSULE WITH IMPROVED ISOLATION, and co-pending application Ser. No. 09/478,434 filed Jan. 6, 2000 entitled CAPACTIVIE PRESSURE SENSING WITH MOVING DIELECTRIC.

FIELD OF THE INVENTION

The present invention relates to pressure sensors.

BACKGROUND OF THE INVENTION

In aviation or industrial fluid pressure sensing applications, fluids (pressurized media) can corrode metal sensing films. Metal sensing films are thus preferably placed inside a pressure sensor body and connecting leads are preferably fed through the body in such a way that corrosive process fluids do not come in contact with the sensing films and connecting leads. Corrosive process fluids can include gasses in an aerospace or stationary turbine engine, acids, caustics, oils, petrochemicals, and the like.

Alumina is a preferred material for sensor bodies because it has excellent mechanical properties and corrosion resistance. It is, however, difficult to bore vias in alumina for connecting leads between a sensing film and an external electronic circuit. Alumina sensors are preferably assembled by direct bonding. With direct bonding, mating surfaces of alumina layers are optically flat, clean and fully in contact with one another, and no bonding substance is used between layers. Any irregularity, such as a metal film feedthrough at the mating surfaces, would hold the mating surfaces apart by a microscopic amount and interfere with the direct bonding.

For demanding industrial, aerospace and turbine applications, an easily manufactured feedthrough seal is needed that does not degrade the high performance of a direct bonded alumina pressure sensor.

SUMMARY OF THE INVENTION

In the present invention, a feedthrough seal is formed by passing leads through a gap at a stepped corner between direct bonded layers of alumina and then filling at least a portion of the stepped corner with a seal that fills the gap.

The pressure sensor includes a beam with a blind end pressurized by fluid and an opposite end shaped to provide the stepped corner with the gap opening at the base of the stepped corner, where the gap is isolated from the fluid. The beam is formed around a central channel that opens through the gap at the isolated end. Sensing film that has an electrical parameter that varies with pressure is placed in the channel. The sensing film connects to the leads that extend out through the gap. The seal fills the gap around the leads and fills a portion of the stepped corner, sealing the channel. The beam including the blind end is integrally formed.

DETAILED DESCRIPTION OF THE PREFERRED EMBODIMENTS

Figure 1:
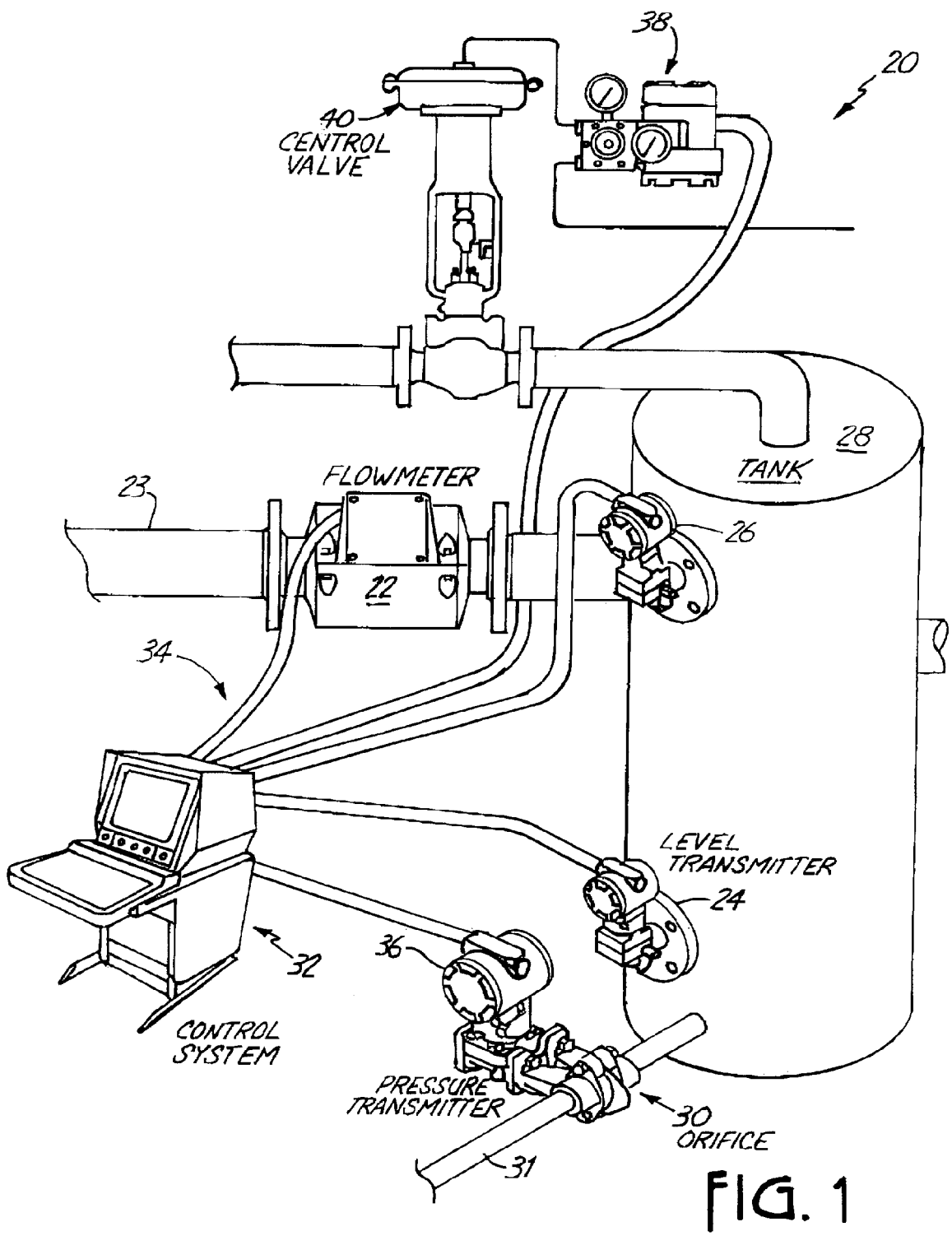
FIG. 1 shows a typical industrial environment.

In FIG. 1, a typical environment for an industrial pressure sensor is illustrated at 20. Process variable transmitters such as flow meter 22 in process fluid line 23, level transmitters 24, 26, 36 near tank 28 and integral orifice flow meter 30 in process line 31 are shown electrically connected to control system 32. Control system 32 controls current to pressure transducer 38 which controls control valve 40. Process variable transmitters can be configured to monitor one or more process variables associated with fluids in a process plant such as slurries, liquids, vapors and gasses in chemical, pulp, petroleum, gas, pharmaceutical, food and other fluid processing plants. The monitored process variables can be pressure, temperature, flow, level, pH, conductivity, turbidity, density, concentration, chemical composition or other properties of fluids. A process variable transmitter includes one or more sensors that can be either internal to the transmitter or external to the transmitter, depending on the installation needs of the process plant.

Process variable transmitters generate one or more transmitter outputs that represent the sensed process variable. Transmitter outputs are configured for transmission over long distances to a controller or indicator via communication busses 34. In typical fluid processing plants, a communication buss 34 can be a 4–20 mA current loop that powers the transmitter, or a fieldbus connection, a HART protocol communication or a fiber optic connection to a controller, a control system or a readout. In transmitters powered by a 2 wire loop, power is kept low to provide intrinsic safety in explosive atmospheres.

Figure 2:
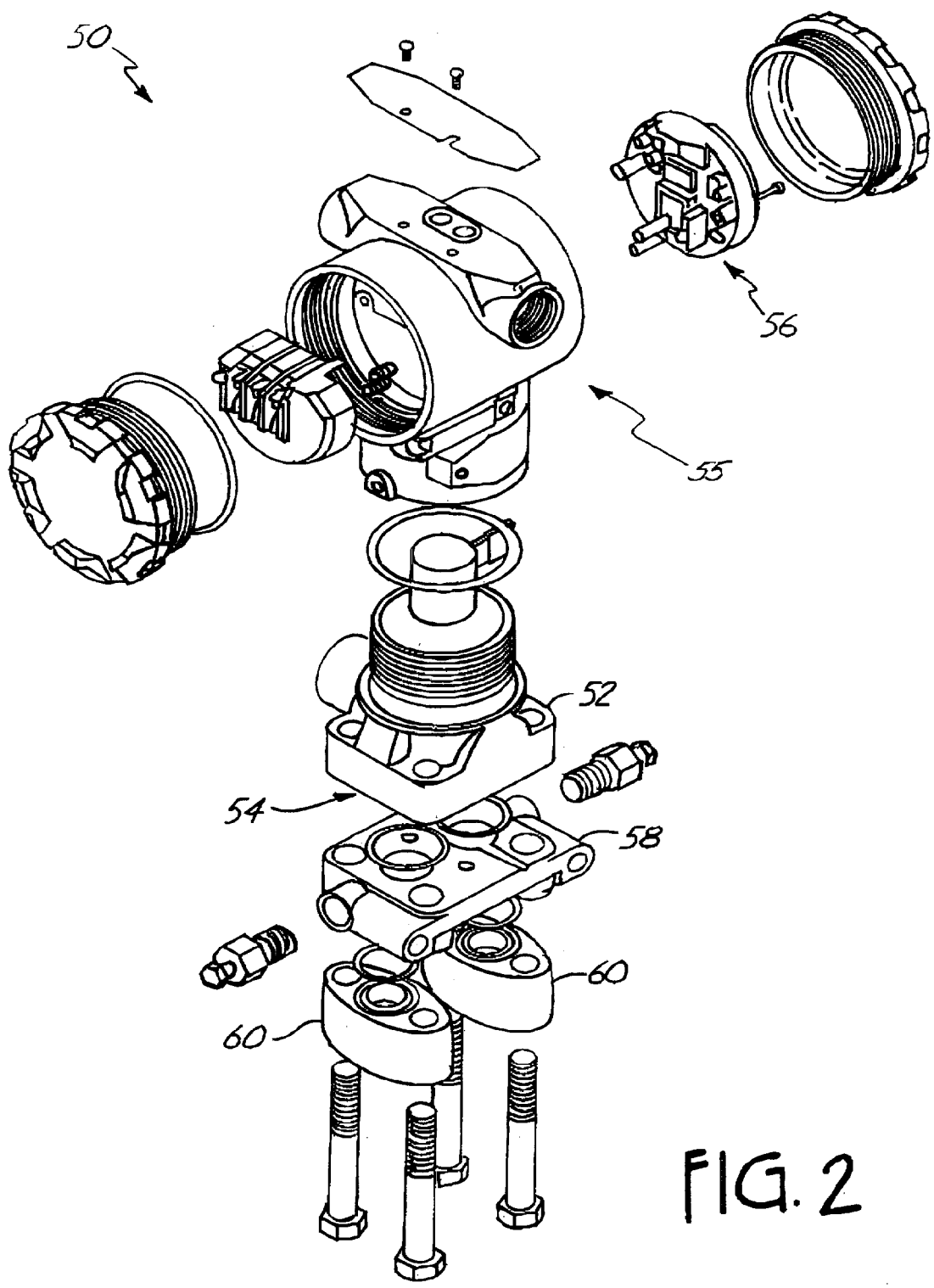
FIG. 2 shows an embodiment of a transmitter.

FIG. 2 shows an exploded view of an example of a pressure transmitter 50. Transmitter 50 includes a flange 52 for receiving a differential pressure and a sensor module 54 that has two absolute pressure sensors (not shown). The sensor module 54 couples to a housing 55 having electronics 56. Transmitter 50 is bolted to flange adapter 58. Flange adapter 58 connects to impulse pipes connected to flange adapter unions 60 or other connection hardware. Each absolute pressure sensor in sensor module 54 includes an integral beam exposed to process fluid and isolated sensor leads that pass through a sealed gap in the beam and connect to transmitter electronics 56.

Figure 3:
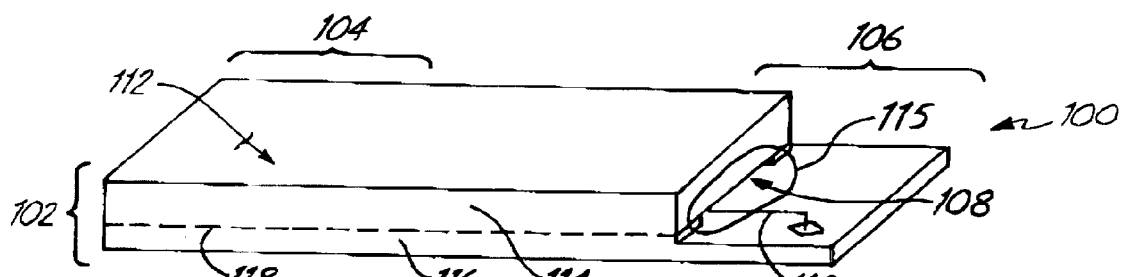
FIG. 3 shows a perspective view of an embodiment of a direct bonded alumina pressure sensor.

FIG. 3 shows a perspective view of a pressure sensor 100. Pressure sensor 100 comprises a beam 102 that is integrally formed around a central channel. The beam 102 has an integral blind end 104 adapted for external fluid pressurization and an opposite end 106 that is shaped to provide a stepped corner with a gap 108 opening at the base of the stepped corner where the gap is isolated from the fluid. The term "blind" indicates that the end is closed or sealed. Gap 108 is an open end of the central channel. A sensing film 112 (inside the sensor 100) is disposed in the channel adjacent the blind end. The sensing film has an electrical parameter that varies with pressure and electrical leads such as lead 110 that extend from the channel and out the gap 108. After the beam has been integrally formed, a seal 115 is applied over gap 108 to fill the gap 108 around the leads 110. The seal fills a portion of the stepped corner. The placement of the seal in the stepped corner or concave region, shelters the seal from damage during handling and provides a high reliability closure for the channel in the sensor. The seal is in a hollow or concave region where it does not protrude outwardly and is unlikely to be struck during handling. The placement of the gap 108 at the base of the stepped corner ensures a large bonding area around the gap, increasing reliability.

Beam 102 is formed by directly bonding alumina layers 114 and 116 together. After direct bonding, there is no joint at 118 and the beam 102 along with its blind end 104 are a single integrated part with a continuous crystal structure across broken line 118. The term "direct bonding" means that optically flat clean surfaces are brought in contact with each other so that they join without any intermediate sealing materials and without the application of an electrical potential or voltage and without melting or fusing or sintering together of bonding surfaces. Extreme chemical and physical cleanliness and precise alignment of the surfaces are desired to achieve a direct bond. Single crystal sapphire is preferred.

Figure 4:
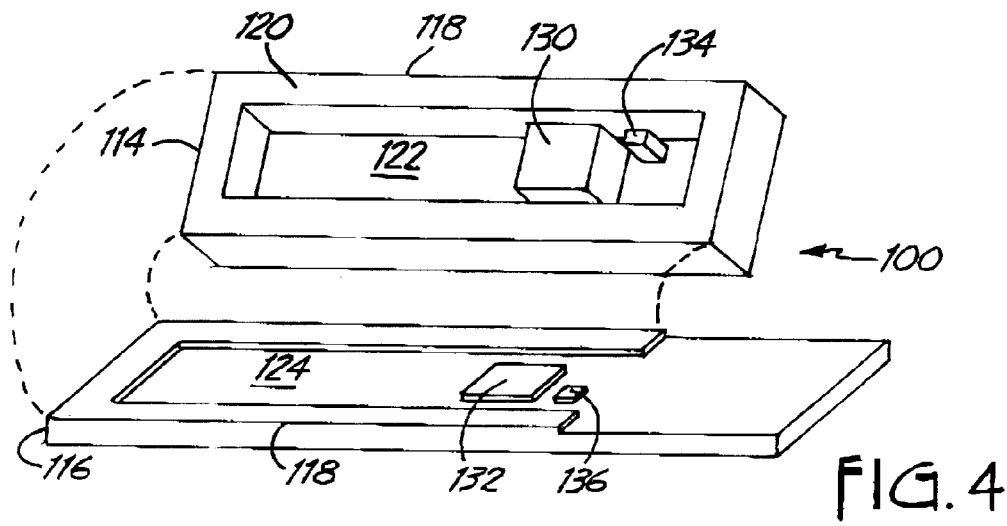
FIG. 4 shows an exploded view of an embodiment of a direct bonded alumina pressure sensor.

In FIG. 4, an exploded view of the sensor 100 of FIG. 1 is shown. Integrally formed beam 102 is preferably formed of directly bonded shaped alumina layers 114 and 116 and the gap 108 is between the layers 114, 116. A first layer 114 is etched to form a first cavity 122 surrounded by an outer rim 120. A second layer 116 is etched to form a second cavity 124 that extends past the outer rim 120, forming the gap 108 between the second cavity 124 and the outer rim 120.

Figure 5:
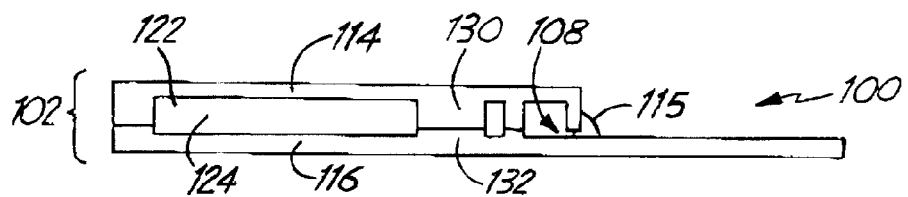
FIG. 5 shows cross-sectional view of a direct bonded alumina sensor.

In FIG. 5, a cross-sectional view of the pressure sensor 100 in FIGS. 3 and 4 is shown. First mesa 130 is aligned with second mesa 132 upon assembly, and the mesas 130, 132 are integrally bonded together to form an integral support. When sensor 100 is joined later to an isolating cup, the integral support is aligned with the joining surfaces of the measurement cup to provide additional support. Third and fourth mesas 134 and 136 are disposed away from the blind end and nearer the isolated end. Upon assembly, mesas 134, 136 do not contact one another. Mesas 134 and 136 have metallic contact material on their facing surfaces. After direct bonding of layers 114 and 116 is completed, the sensor 100 is heated to cause the metallic contact material on mesas 134 and 136 to grow and complete an electrical connection between the two mesas 134 and 136. This electrical connection is completed after direct bonding so that it does not interfere with the close contact required between layers 114 and 116 for direct bonding. The growable material can be tantalum or platinum.

The presence of a channel in each of the layers makes it easier to assemble the layers with precise alignment between the mating surfaces. There is a gap left for the leads to exit the channel so that the leads do not interfere with the precise alignment. After the direct bonding is completed, the seal 115 is applied. Seal 115 is spaced well away from the pressure sensing at blind end 104 so that the different temperature expansion coefficient of the seal 115 relative to the beam 102 does not adversely affect sensing at blind end 104 when there are temperature changes.

Figure 6:
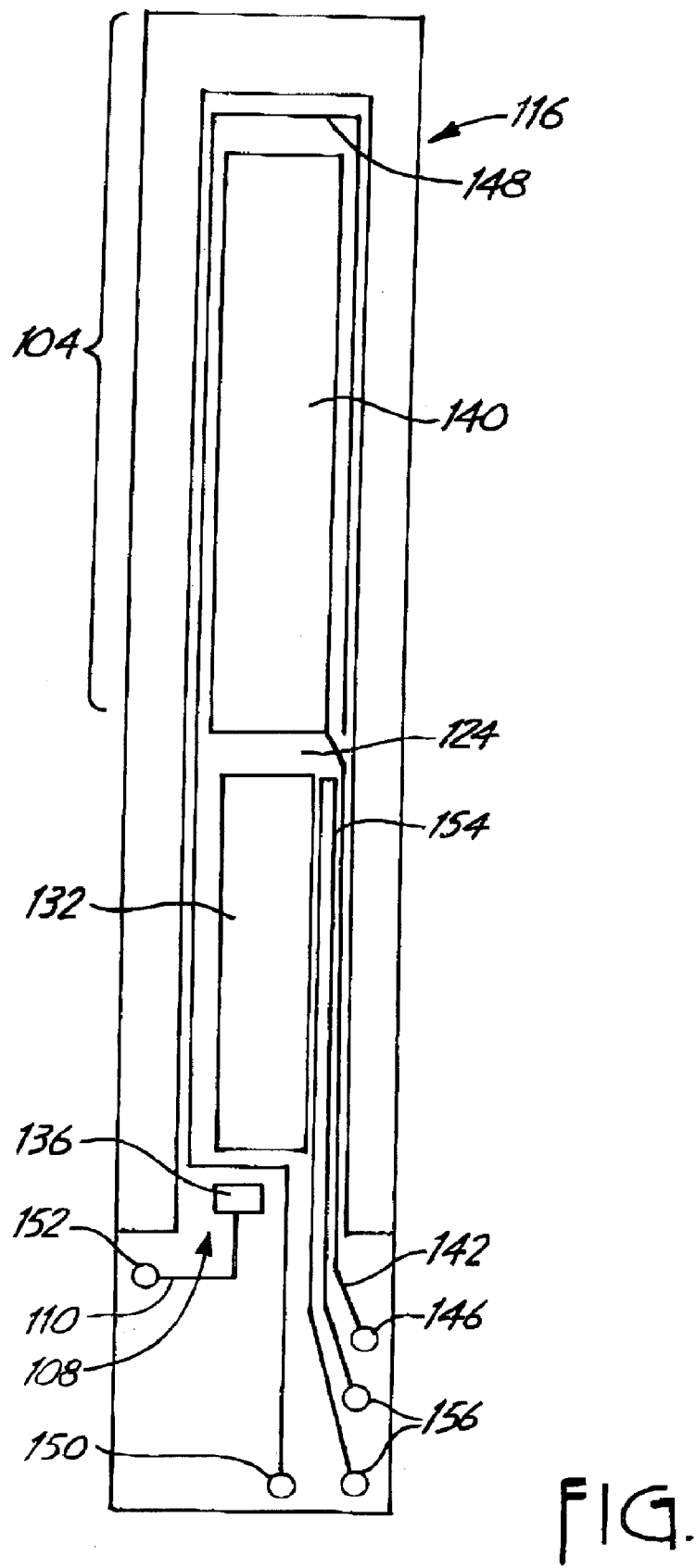
FIG. 6 shows a view of a first layer of a direct bonded alumina pressure sensor.

In FIG. 6, a plan view of the layer 116 of FIGS. 3–5 is shown in further detail. Sensing film 112 includes a first capacitor plate 140 with an electrical lead or connection 142 extending from the channel 124 out the gap 108 to an electrical contact pad 146. Sensing film 112 also includes an electrostatic shield lead 148 which shields capacitor plate 140 from stray coupling. Electrostatic shield lead 148 also extends from the channel 124 and out the gap 108 to a contact pad 150. Mesa 136 includes a lead 152 for connection. A temperature sensing element 154 is also included on layer 116. Temperature sensing element 154 connects to electrical contact pads 156.

When the blind end 102 is subjected to process pressure, the capacitor plate 140 deflects toward a facing capacitor plate on layer 114, and an electrical parameter, capacitance between the plates, varies as a function of pressure.

Tungsten is preferred for the capacitor plates and the leads.

Figure 7:
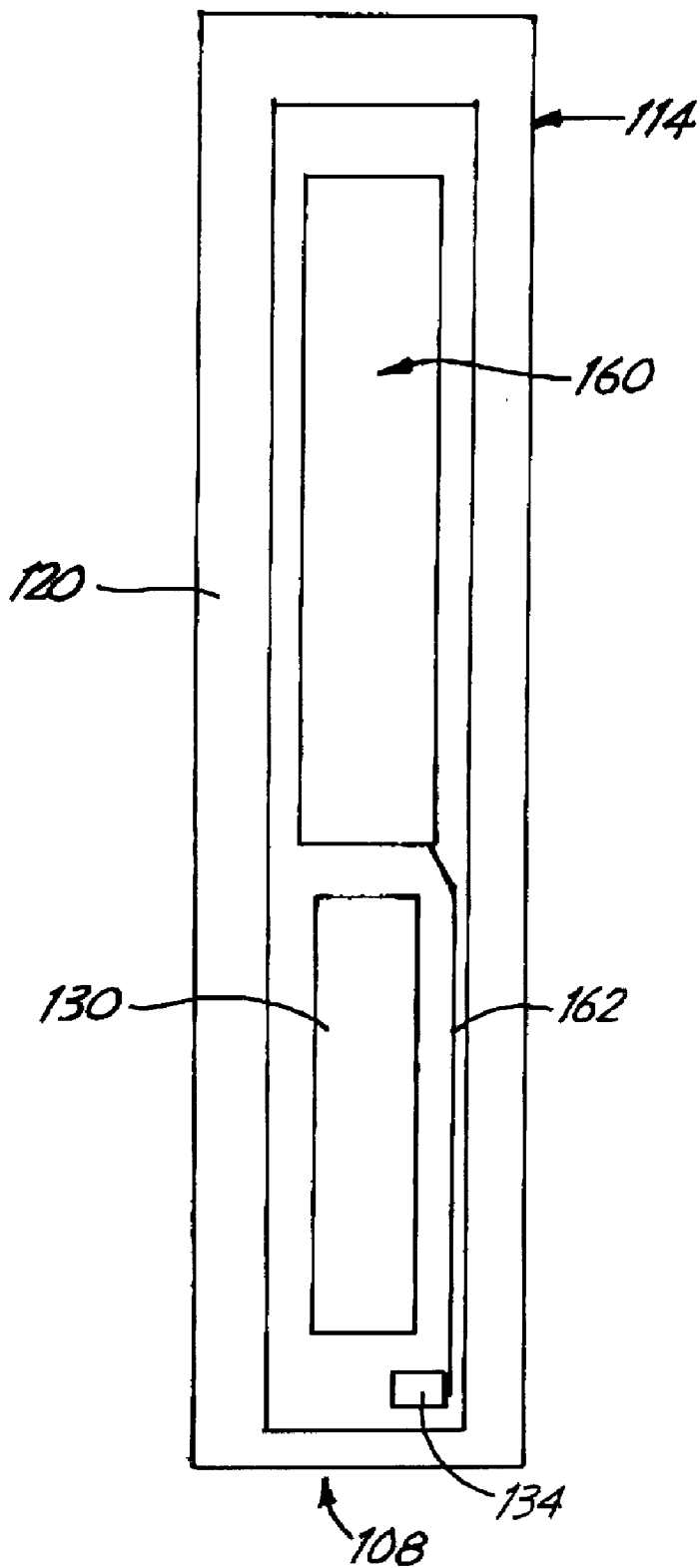
FIG. 7 shows a view of a second layer of a direct bonded alumina pressure sensor.

In FIG. 7, a plan view of the layer 114 of FIGS. 3–5 is shown in further detail. Sensing film 112 includes a second capacitor plate 160 with an electrical lead or connection 162 extending to the mesa 134. The connection to capacitor plate 160 extends through the grown contact on mesa 134 to mesa 136 and to lead 152 which extends out the gap 108 to an electrical contact pad shown in FIG. 7.

Alternatively, the sensor can also be constructed using three or more capacitor plates to avoid making interconnections for capacitor leads between the substrates. The arrangement of the three capacitor plates forms a series circuit of two capacitances, both of which vary in the same direction with changes in pressure. The use of electrical connections between the first and second substrates is thus avoided.

Figure 8:
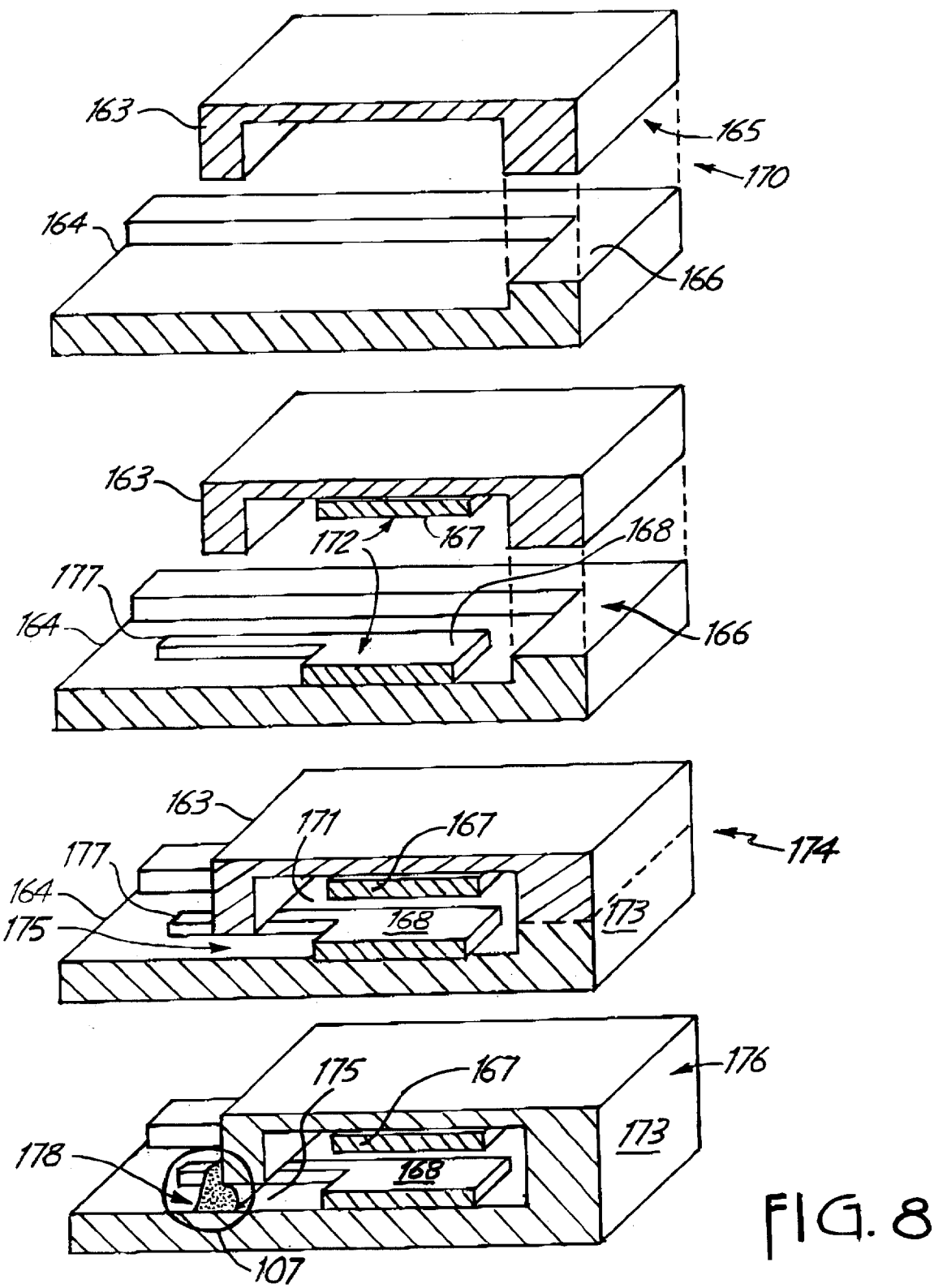
FIG. 8 shows sectional views of a pressure sensor during a process of manufacturing a direct bonded aluminum pressure sensor.

The sensor is manufactured by a preferred method illustrated by sectional views in FIG. 8. First, multiple layers 163, 164 are shaped to form the components of a beam as shown at 170. Mating surfaces 165, 166 are finished to be optically flat for direct bonding. Next, sensing films 167, 168 are deposited on one or more of the layers of alumina as shown at 172. Then, the shaped layers 163, 164 are stacked in direct contact with one another to form the beam having a central channel 171 that is blind at one end 173, and has a gap 175 at the other end, and the sensing films 167, 168 are in the channel 171 with leads 177 extending from the channel and out the gap 175 as shown at 174. The beam is then heated, forming an integral beam 176 by heating the stacked layers while the layers are in direct contact with one another.

The channel is sealed by forming a seal 178 in the gap around the leads as shown. The seal 178 is preferably a glass frit and the channel is preferably sealed with a vacuum in it to make the sensor an absolute pressure sensor.

In FIG. 8, The seal 178 is initially formed in the stepped corner of the sensor with a viscous mixture comprising ethyl cellulose and finely divided glass dust, or in other words, a glass frit. After seal 178 is applied, the temperature of the sensor is raised to about 400 degrees Centigrade in air. At this temperature, the ethyl cellulose decomposes, releasing water vapor and carbon dioxide, leaving the seal 178 in a porous condition.

The sensor is then placed in a high vacuum chamber to provide a high vacuum between $10^{-6}$ and $10^{-7}$ Torr. The water vapor and other gasses in the channel flow out through the porous seal 178. The gap covered by the glass frit has a width that is narrow enough to prevent the glass frit from being drawn into the channel, but wide enough to allow moisture and other gasses to flow out the porous seal in a practical length of time, and wide enough to ensure that electrical leads on one substrate do not contact the facing substrate during bonding of the substrates. It is found that a width of about 0.5 micron works in one embodiment, however this width can be varied as needed depending on the geometry of the channel, the porosity characteristics of the frit, and the temperature of the sensor during evacuation to achieve a practical time period for evacuation.

The temperature of the sensor is then increased to about 650 degrees centigrade. At this temperature, the contacting surfaces of the particles in the frit melt together. The seal densifies, closing off the pores in the seal 178. The seal 178 bonds tightly to the stepped corner of the body of the sensor, sealing off the channel with a high quality vacuum trapped in the channel. The seal 178 is protected from mechanical damage in the stepped corner.

The sensor is then allowed to cool in the high vacuum chamber and the frit solidifies, forming a permanent non-porous seal over the gap at the base of the stepped corner, with a high quality vacuum on the order of $10^{-6}$ to $10^{-7}$ Torr. trapped in the channel. It is found that the extremely high quality vacuum in the sensor cavity provides a sensor that is very insensitive to temperature and very stable over long periods of time.

When there are multiple channels, and a single electrical lead is brought out of each channel, the multiple seals can also be formed of an electrically conductive material. When multiple channels are used, electrically conductive materials are preferred because the conductive seals can also serve as a bonding pad for connection of a wire lead external to the sensor. Various glasses, metals or other materials can be used to form the seal 178 provided that the materials form hermetic seals, do not produce vapors which can degrade the high vacuum in the channel, and are not corrosive.

Figure 9:
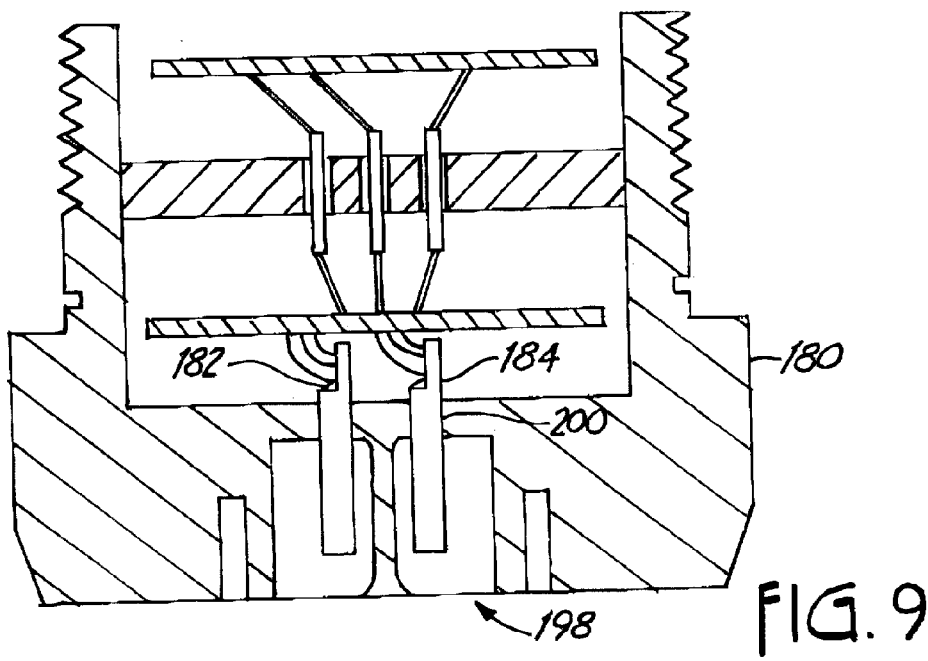
FIG. 9 shows an embodiment of a sensing module with a direct bonded alumina pressure sensor.

In FIG. 9, a pressure sensing module 180 is shown which corresponds to flange 52 shown in FIG. 2. Assembly 180 includes two sensors 182, 184 as shown in FIGS. 3–7. In FIG. 9, an isolation cup 198 has an opening 200 sealed to an outer surface of the beam between the blind end and the opposite, isolated end.

Figure 10:
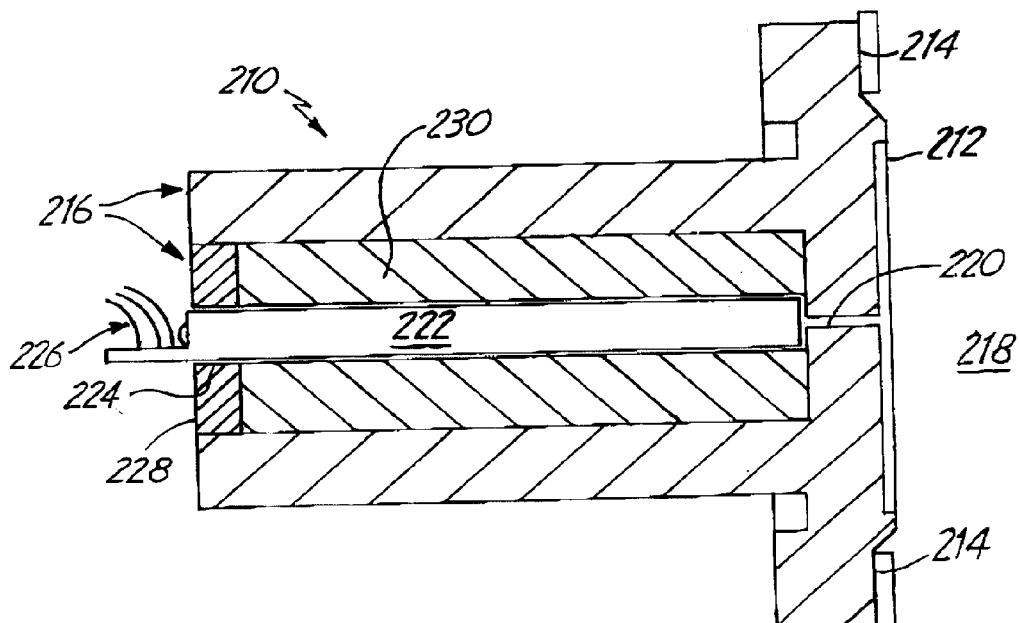
FIG. 10 shows an embodiment of an isolator module with a direct bonded alumina pressure sensor.

In FIG. 10, a sensing module 210 is shown that includes an isolator diaphragm 212 with a rim 214 sealed to an isolator cup 216. Isolator diaphragm 212 separates process fluid 218 from isolator fluid 220 that is sealed in the space enclosed by the isolator cup 216 and the isolator diaphragm. Sensor 222 is constructed as shown in FIGS. 4–8 and is sealed to an opening 224 in the isolator cup 216. The isolator diaphragm 212 and isolator fluid 220 couple pressure to the sensor 222 while isolating the sensor from the process fluid 218. Isolator cup 216 has sensor 222 passing through sealed opening 224 and isolates electrical connections 226 on the sensor 222 from both the pressurized process fluid 218 and the pressurized isolator fluid 220. The isolator cup can include a back plate 228 which has a temperature coefficient of expansion closely matched to the temperature coefficient of expansion of the sensor 222. A block of material 230 can be pressed in the isolator cup 216 and material 230 has a temperature coefficient of expansion which partially compensates for the temperature coefficient of expansion of the isolator fluid 220 to limit undesired movement of isolator diaphragm 212 due to temperature changes. A small gap filled with isolator fluid 220 is provided between block 230 and sensor 222.

Figure 11:
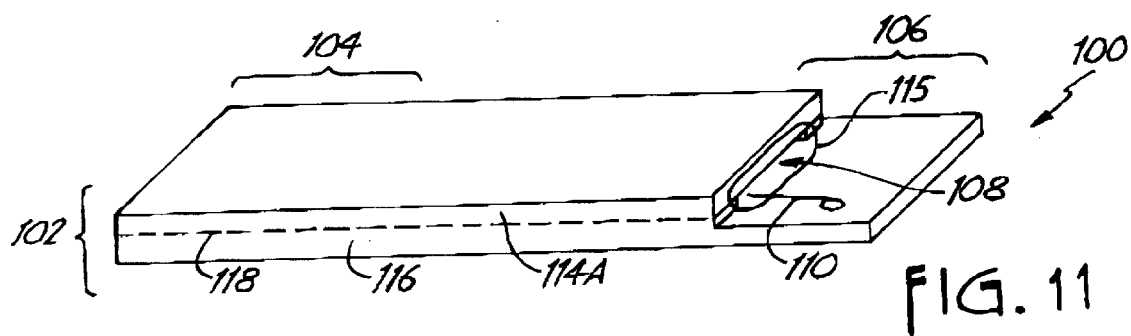
FIGS. 11, 12, 13 show an embodiment of a direct bonded alumina pressure sensor similar to that shown in FIGS. 3, 4, 5 but including one flat layer.
Figure 12:
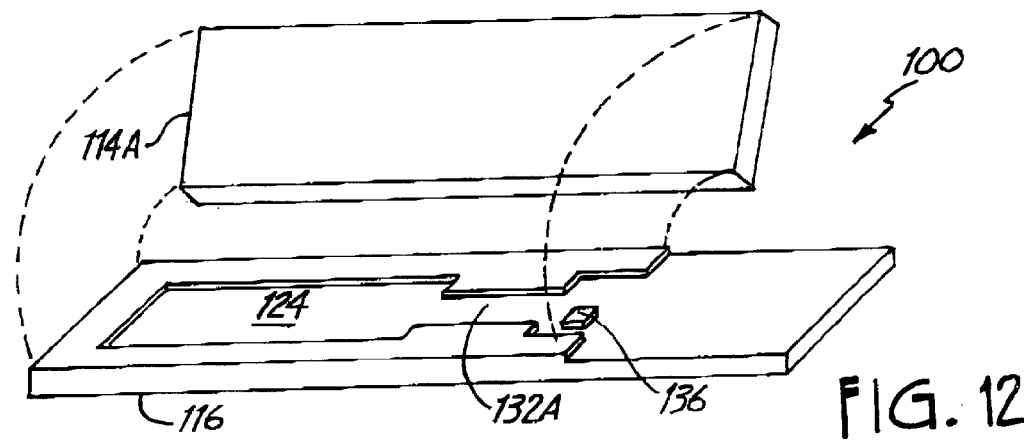
Figure 13:
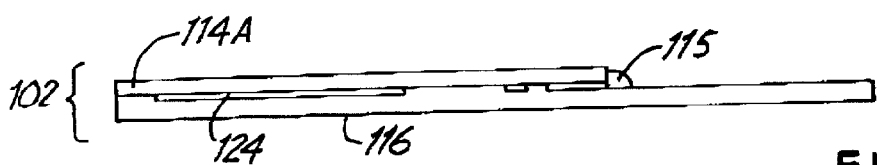
Figure 14:
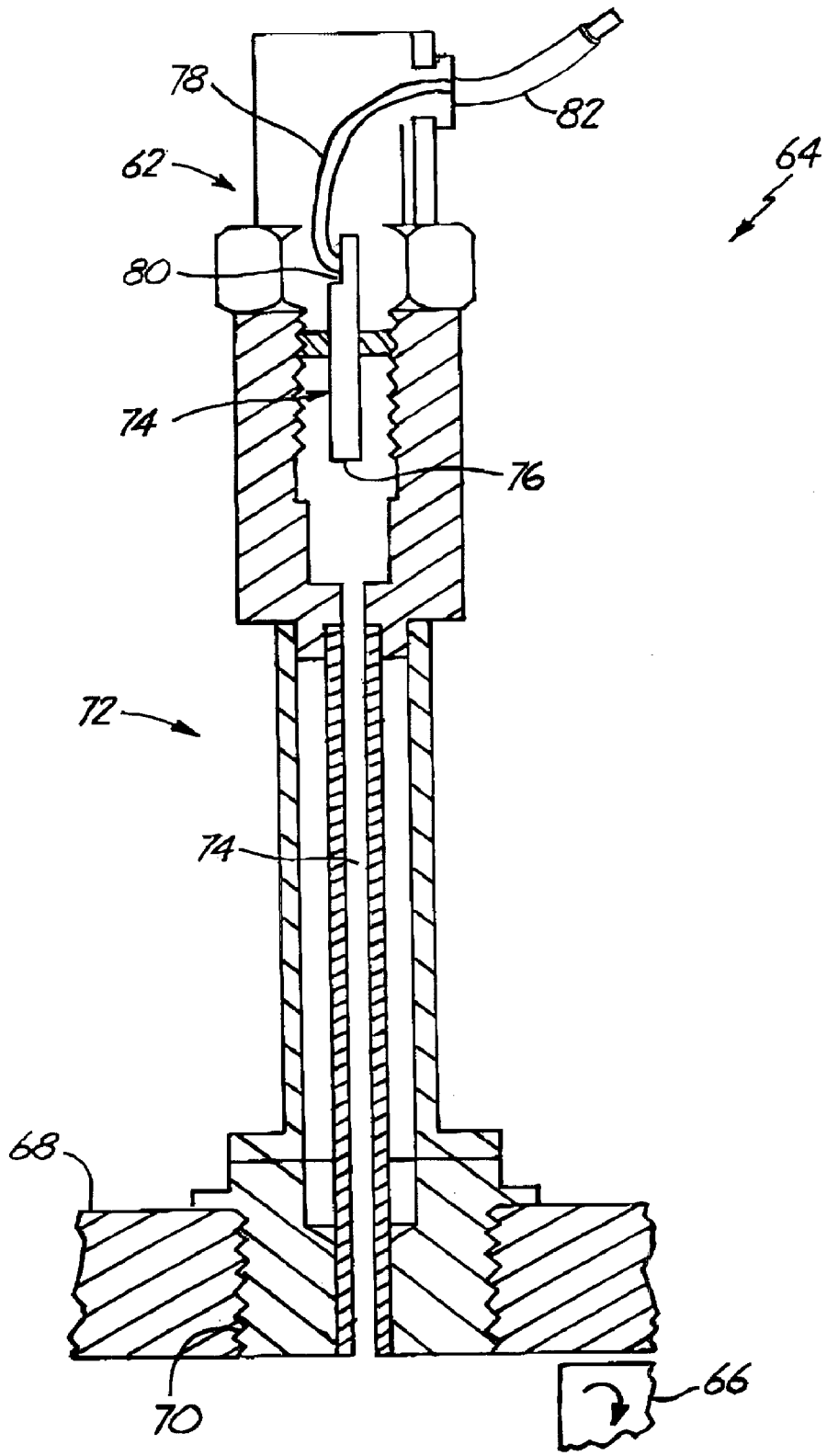
FIG. 14 shows an embodiment of a direct bonded alumina pressure sensor for a turbine engine.

An alternative sensor shown in FIGS. 12, 13, 14 is similar to the sensor shown in FIGS. 3, 4, 5. In FIGS. 11, 12, 13 the layer 114A has a flat face, while the corresponding layer 114 in FIGS. 3, 4, 5 has a groove in it. In FIGS. 12, 13, 14, there is a narrowed neck 132A instead of a mesa 132 to provide support for mounting. The arrangement shown in FIGS. 11, 12, 13 is also sealed with a seal 115. Reference numbers used in FIGS. 12, 13, and 14 are the same as those used in FIGS. 3, 4, 5 and identify similar features.

FIG. 14 shows a pressure sensor arrangement 62 for a turbine engine arrangement 64. The turbine engine includes turbine engine blades such as blade 66 rotating in a turbine engine housing 68. A hole 70 is provided in the turbine engine housing 68 for sensing pressure in the turbine engine. Pressure sensor arrangement 62 is spaced apart from the turbine housing 68 by a pedestal 72. Pedestal 72 spaces pressure sensor arrangement 62 away from the turbine housing to provide a lower temperature environment for pressure sensor arrangement 62. A passageway 74 through pedestal 72 couples the pressurized gasses inside the turbine housing to the pressure sensing arrangement 62. A pressure sensor 74 is included in pressure sensing arrangement 62. Pressure sensor 74 includes an integral beam with an integral blind end 76 exposed to the pressurized gasses. Pressure sensor 74 also includes isolated sensor leads 78 that pass through a sealed gap 80 in the beam and connect to electronic conversion circuits (not shown) by leads 82.

Although the present invention has been described with reference to preferred embodiments, workers skilled in the art will recognize that changes may be made in form and detail without departing from the spirit and scope of the invention.

What is claimed is:

1. A pressure sensor, comprising:
   a beam integrally formed around a central channel, the beam having an integral blind end adapted for fluid pressurization and an opposite end shaped to provide a stepped corner with a gap opening at a base of the stepped corner where the gap is isolated from the fluid;
   a sensing film in the central channel adjacent the blind end, the sensing film having an electrical parameter that varies with pressure and electrical leads extending from the channel and out the gap; and
   a glass frit seal filling the gap around the leads, the glass frit seal filling a portion of the stepped corner.

2. The pressure sensor of claim 1 wherein the beam is formed of directly bonded shaped alumina layers and the gap is between the layers.

3. The pressure sensor of claim 2 wherein the layers include:
   a first layer having a first cavity etched in the first layer, the first cavity surrounded by an outer rim;
   a second layer having a second cavity etched in the second layer, the second cavity extending past the outer rim, forming the gap between the second cavity and the outer rim.

4. The pressure sensor of claim 2 wherein the electrical parameter that varies with pressure is capacitance.

5. The pressure sensor of claim 4 wherein at least one of the alumina layers is formed of single crystal alumina.

6. The pressure sensor of claim 5 wherein the beam is formed of multiple layers of single crystal material.

7. The pressure sensor of claim 6 wherein the leads going out the gap are formed of the same material as the sensing film.

8. A pressure sensor module, comprising:
- a beam integrally formed around a central channel, the beam having an integral blind end adapted for fluid pressurization, and an opposite end shaped to provide a stepped corner with a gap opening at a base of the stepped corner where the gap is isolated from the fluid;
- a sensing film in the central channel adjacent the blind end, the sensing film having an electrical parameter that varies with pressure, and electrical leads extending from the channel and out the gap;
- a glass frit seal filling the gap around the leads, the glass frit seal filling a portion of the stepped corner; and
- an isolation cup having an opening sealed to an outer surface of the beam between the blind end and the opposite end.

9. The pressure sensor module of claim 8 wherein the beam is formed of alumina.

10. The pressure sensor module of claim 8, further comprising:
- isolation fluid filling the isolation cup; and
- an isolator diaphragm having a rim sealed to the isolator cup, the isolator diaphragm being adapted for separating a process fluid from the pressurized isolation fluid.

11. A pressure transmitter, comprising:
- an integrally formed beam having a central channel along the beam, the beam having an integral blind end adapted for fluid pressurization and an opposite end shaped to provide a stepped corner with a gap at the base of a stepped corner, where the gap is isolated from the fluid;
- a sensing film in the central channel adjacent the blind end, the sensing film having an electrical parameter that varies with pressure, and having electrical leads extending from the channel and out the gap;
- a glass frit seal filling the gap around the leads, the glass frit seal filling a portion of the stepped corner; and
- an electronic circuit coupled to the leads and providing a transmitter output representative of the sensed pressure.

12. The pressure transmitter of claim 11 wherein the beam is formed of alumina.

13. The transmitter of claim 11, further comprising:
- an isolator having a first opening sealed to an outer surface of the beam between the blind end and the opposite end and a second opening sealed with an isolation diaphragm.

14. The transmitter of claim 11 further comprising:
- a second beam, second seal and second sensing film coupled to the electronic circuit, the transmitter sensing differential pressure.

15. A turbine engine pressure probe, comprising:
- a mounting pedestal having a first end adapted for mounting to a turbine engine housing and having a second end spaced apart from the first end and having an opening shaped to receive a pressure sensor and extending through the mounting pedestal to the first end; and
- a pressure sensor, comprising:
  - a beam disposed in the opening integrally formed around a central channel, the beam having an integral blind end adapted for pressure in an airstream and an opposite end shaped to provide a stepped corner with a gap opening at a base of the stepped corner where the gap is isolated from the airstream;
  - a sensing film in the central channel adjacent the blind end, the sensing film having an electrical parameter that varies with the pressure, and having electrical leads extending from the channel and out the gap; and
  - a glass frit seal filling the gap around the leads, the glass frit seal filling a portion of the stepped corner.

16. A pressure sensor, comprising:
- first means for providing a sensor body integrally formed around a central channel, the first means having an integral blind end adapted for fluid pressurization and an opposite end shaped to provide a stepped corner with a gap opening at a base of the stepped corner where the gap is isolated from the fluid;
- second means for sensing formed in the central channel adjacent the blind end, the second means having an electrical parameter that varies with pressure and electrical leads extending from the channel and out the gap; and
- third means for sealing the gap around the leads, the third means filling a portion of the stepped corner.

* * * * *